(12) United States Patent
Thornton

(10) Patent No.: US 7,669,424 B2
(45) Date of Patent: Mar. 2, 2010

(54) COMBUSTOR ASSEMBLY

(75) Inventor: James M. Thornton, Matlock (GB)

(73) Assignee: Rolls-Royce PLC, London (GB)

( * ) Notice: Subject to any disclaimer, the term of this patent is extended or adjusted under 35 U.S.C. 154(b) by 632 days.

(21) Appl. No.: 11/635,053

(22) Filed: Dec. 7, 2006

(65) Prior Publication Data
US 2007/0151259 A1 Jul. 5, 2007

(30) Foreign Application Priority Data
Jan. 4, 2006 (GB) ................... 0600052.5

(51) Int. Cl.
*F02C 7/00* (2006.01)
(52) U.S. Cl. .............................. 60/796; 60/740; 60/800; 277/606
(58) Field of Classification Search .................... 60/740, 60/752, 796, 799, 800, 801, 803; 277/606; 285/192, 193, 200, 225
See application file for complete search history.

(56) References Cited

U.S. PATENT DOCUMENTS

| | | |
|---|---|---|
| 3,879,940 A | 4/1975 | Stenger et al. |
| 4,409,791 A * | 10/1983 | Jourdain et al. ............... 60/240 |
| 4,441,323 A | 4/1984 | Colley |
| 4,466,240 A | 8/1984 | Miller |
| 5,305,609 A * | 4/1994 | Guinan et al. ................. 60/740 |
| 5,771,696 A | 6/1998 | Hansel et al. |
| 2007/0137218 A1 * | 6/2007 | Prociw et al. ................. 60/796 |

FOREIGN PATENT DOCUMENTS

| | | |
|---|---|---|
| EP | 1 424 469 A2 | 6/2004 |
| GB | 1 442 184 A | 7/1976 |

* cited by examiner

*Primary Examiner*—Louis J Casaregola
(74) *Attorney, Agent, or Firm*—Oliff & Berridge, PLC

(57) ABSTRACT

A combustor assembly for a gas turbine engine comprises a casing arrangement defining an aperture and a seal element mounted on the casing arrangement through which a component of the combustor can extend. The seal element comprises a relatively flexible force absorbing portion and a relatively rigid sealing portion. The force absorbing portion is provided between the sealing portion and the casing arrangement. The force absorbing portion is resiliently deformable to absorb force during movement of the casing arrangement. Such resilient deformation restricts transmission of the forces to the sealing portion. The seal element may be configured to carry a seal member.

25 Claims, 4 Drawing Sheets

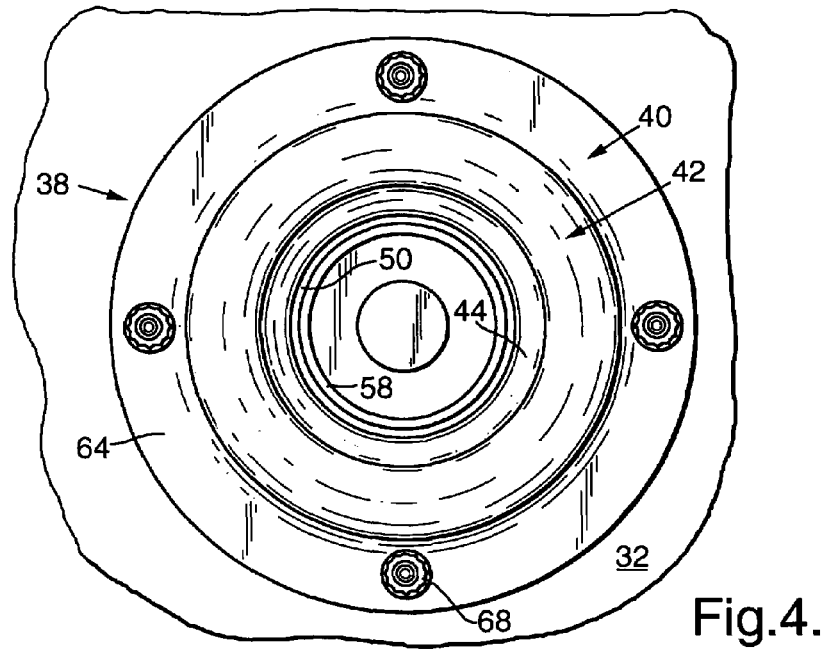
Fig.4.
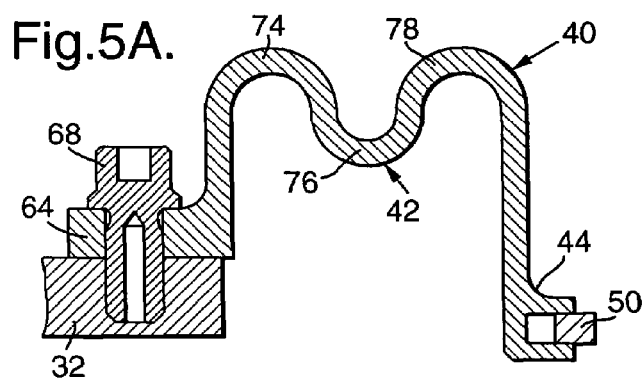
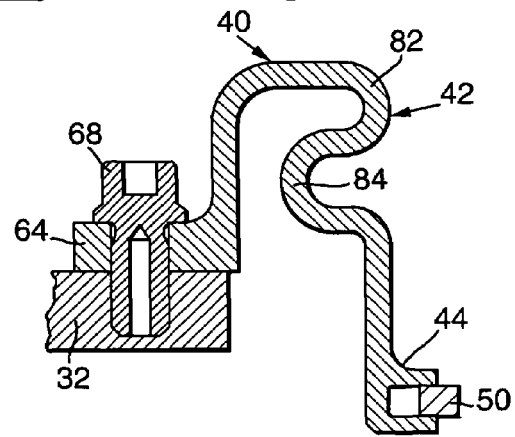

COMBUSTOR ASSEMBLY

This invention relates to combustor assemblies for gas turbine engines.

The fuel injectors for the combustor of a gas turbine engine extend through apertures in the combustion outer casing and the combustion support casing of the engine. The injector is bolted to the combustor support casing, but is movable relative to the combustor outer casing, which occurs due to movement of the casings during operation of the engine.

The injector is mounted on a seal carrier carrying a sealing ring, which sealingly engages against the inner wall of a cylindrical seal liner. However, this arrangement has the disadvantage that, as the combustor outer casing becomes distorted due to thermal and mechanical loads placed on it during engine running, the shape of the aperture through which the injector extends also becomes distorted to an oval shape. This means that the sealed carrier no longer sealingly engages against the inner surface of the liner, and leakage occurs.

According to one aspect of this invention, there is provided a combustor assembly for a gas turbine engine, the combustor assembly comprising: a casing arrangement defining an aperture; and a seal element mounted on the casing arrangement at said aperture through which a component of the combustor can extend; characterised in that the seal element comprises a relatively flexible force absorbing portion and a relatively rigid sealing portion, the force absorbing portion being provided between the sealing portion and the casing arrangement, and the force absorbing portion being resiliently deformable to absorb forces during movement of the casing arrangement, whereby such resilient deformation restricts transmission of the forces to the sealing portion.

The sealing portion may comprise a holder and may further include the seal member, which may be held by the holder.

The seal element may be annular in configuration. The force absorbing portion may be annular in configuration. The sealing portion may be annular in configuration. The force absorbing portion and the sealing portion may be concentric with respect to one another. The force absorbing portion may extend around the sealing portion.

The force absorbing portion may comprise a curved member, which may be semi-circular or of varying radius.

The holder may define an inwardly facing recess, such that the seal member extends inwardly from the holder.

The combustor assembly may further include a seal engagement member against which the seal member can seal. The aforesaid component of the combustor may be mounted on the engagement member. The engagement member may define a tubular portion through which the component can extend. The engagement member may comprise a securing portion to seal the aforesaid component to the engagement member. The securing portion may comprise a flange, which may be cooperable with fastening means to fasten the engagement member to the component.

The casing arrangement may comprise an outer casing. The casing arrangement may further include an inner casing. The engagement member may be secured to the inner casing, preferably via the securing portion.

In the preferred embodiment, the aforesaid component of the combustor comprises a fuel injector.

Preferably, the combustor is of an annular configuration comprising a plurality of the aforesaid component spaced from each other. The casing arrangement may define a plurality of the apertures spaced from one another. The seal element may be generally circular in configuration, and the force absorbing portion may comprise a diaphragm. Preferably, the force absorbing portion comprises a curved region to provide at least some of the flexibility.

The seal element may comprise a mounting portion extending from the force absorbing portion to secure the seal element to the casing arrangement. The mounting portion may comprise a flange extending around the seal element.

The engagement member may be substantially cylindrical in configuration and at least part of the aforesaid component of the combustor may extend generally along the main axis of the cylinder.

Preferably, the seal member is generally circular in configuration. The seal member may have an inwardly facing sealing surface, to seal against an outwardly facing sealing surface of the engagement member.

An embodiment of the invention will now be described by way of example only, with reference to the accompanying drawings, in which:

FIG. 4 is a top plan view of a seal carrier; and

FIGS. 5A and 5B are alternative configurations of a force absorbing portion.

Figure 1:
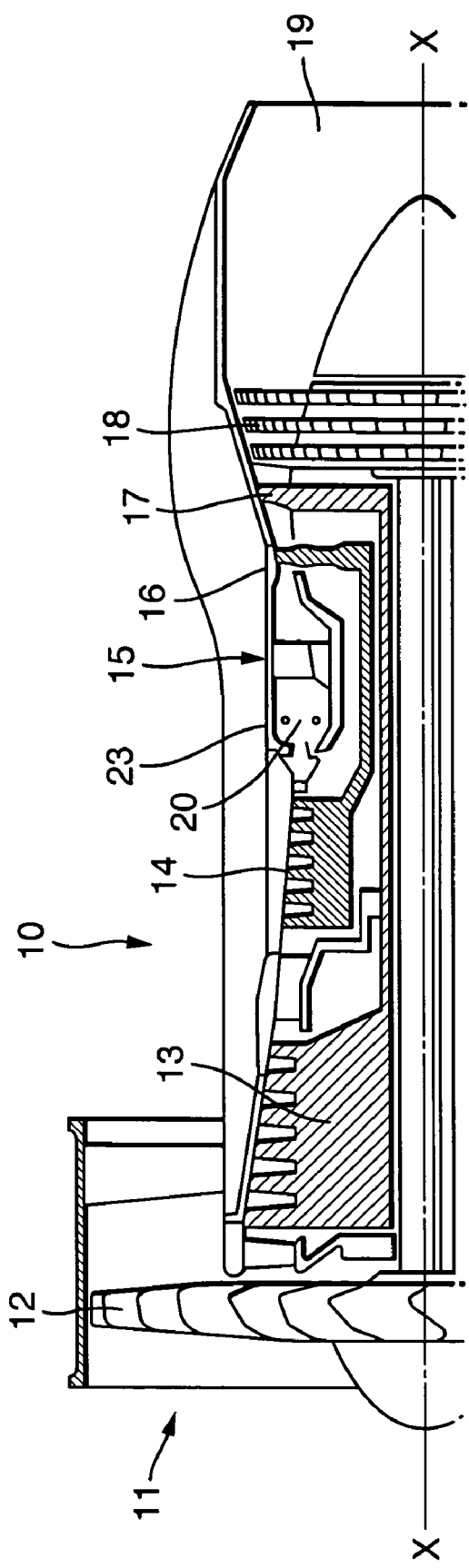
FIG. 1 is a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor assembly 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor assembly 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

Figure 2:
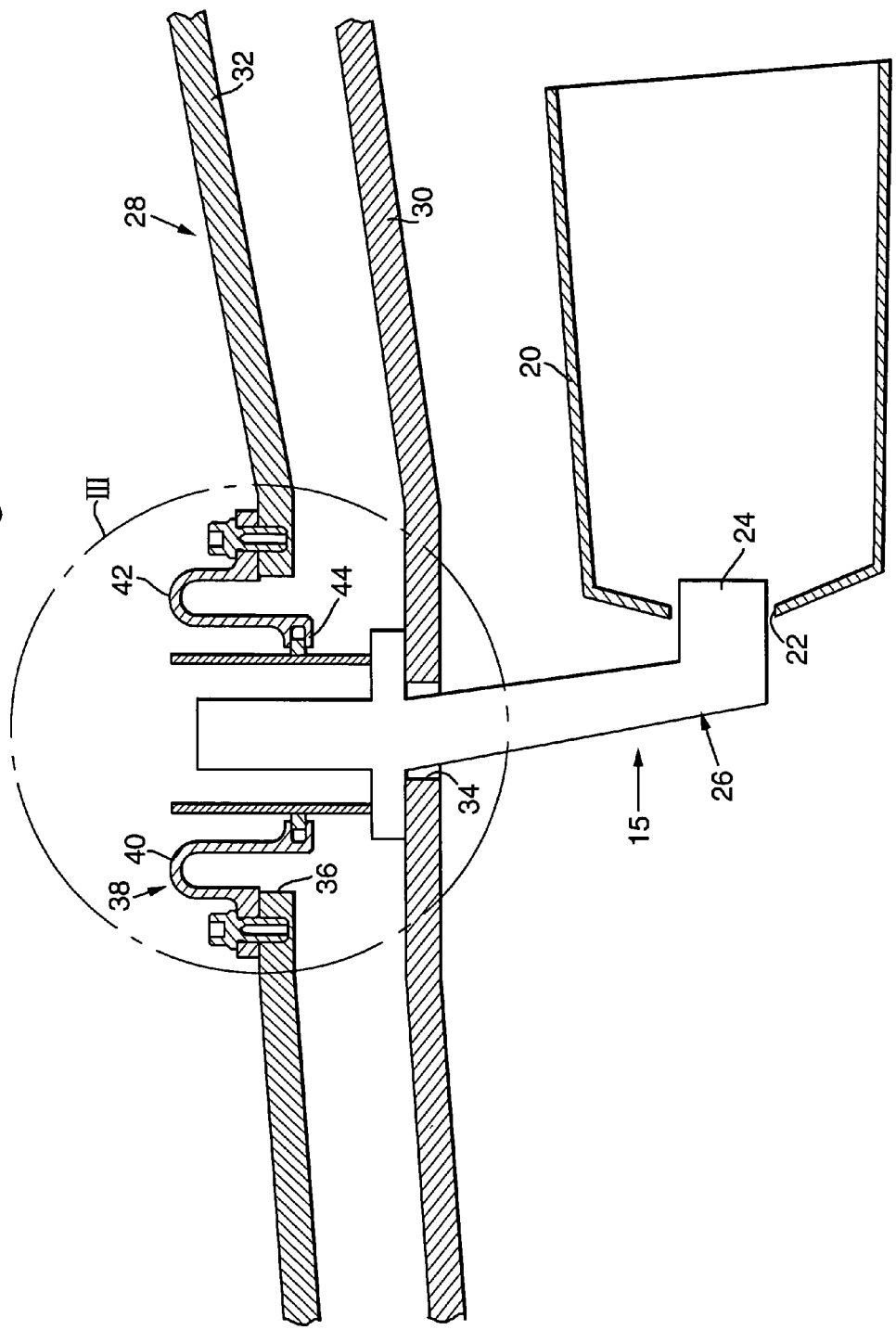
FIG. 2 is a diagrammatic view of a region of a combustion assembly.

Referring to FIG. 2, there is shown a region of the combustor assembly 15 comprising an annular combustor 20 defining a plurality of upstream apertures 22, each receiving a nozzle 24 of a fuel injector 26.

An annular casing arrangement 28 extends around the combustor 20 and comprises an inner casing 30, and an outer casing 32. The inner casing 30 defines a plurality of apertures 34 through each of which a respective one of the fuel injectors 26 can extend. Similarly, the outer casing 32 defines a plurality of outer apertures 36 through each of which the fuel injector 26 can extend.

In order to seal the fuel injector 26 relative to the outer casing 32, a seal assembly 38 is provided at each of the apertures 36 in the outer casing 32. The seal assembly 38 comprises a seal element in the form of a radially outer seal carrier 40 having a relatively flexible annular force absorbing portion 42, and a relatively rigid sealing portion 44.

Figure 3:
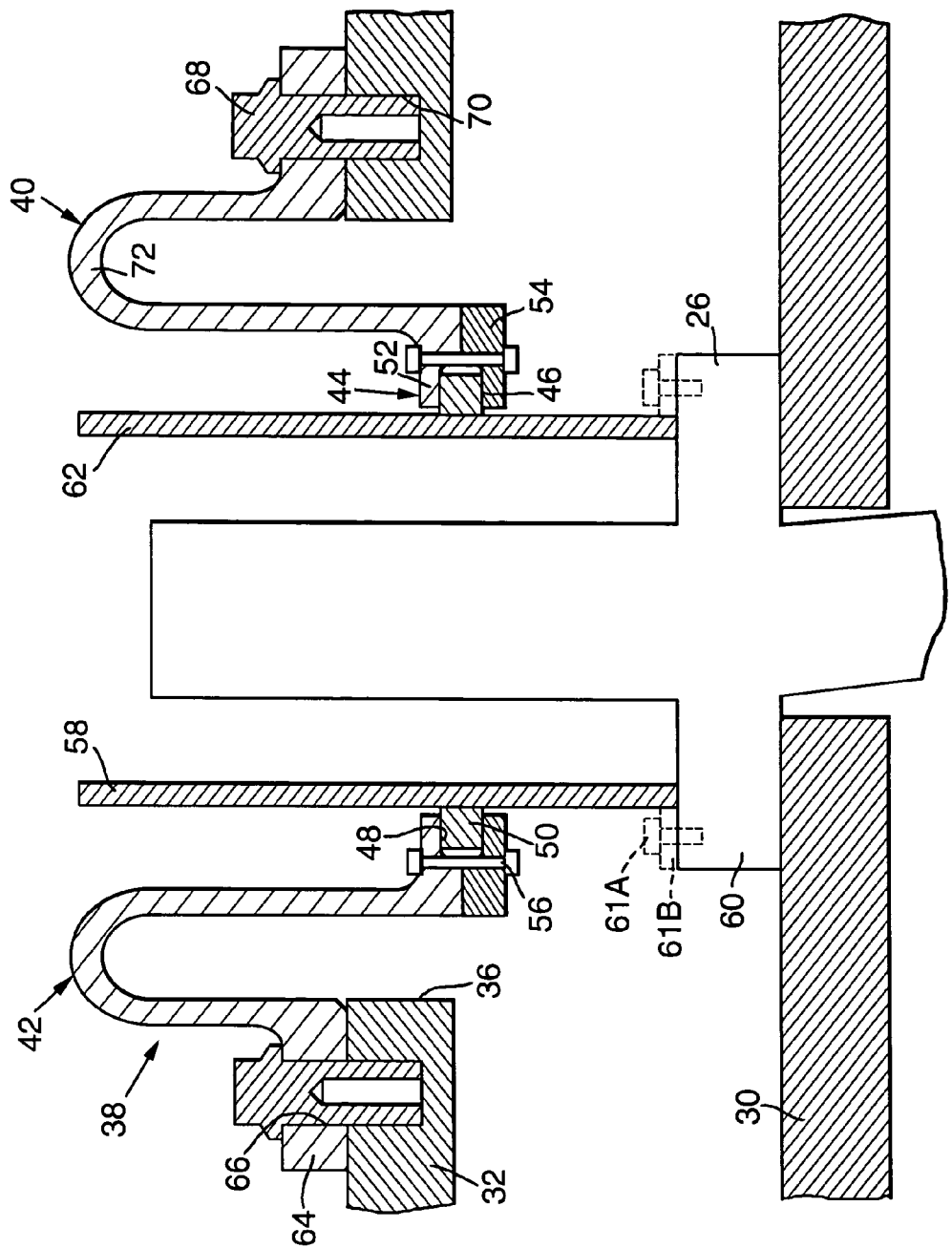
FIG. 3 is as diagrammatic view of a region marked III in FIG. 2.

Referring to FIG. 3, there is shown a sectional side view of the seal assembly 38 which it can be seen that the sealing portion 44 comprises a circular holder 46 defining an annular recess 48 in which an annular seal member 50 is held. The holder 44 comprises an annular upper portion 52 integral with the force absorbing portion 42, and an annular lower portion 54 attached to the upper portion 52 by rivets 56. A plurality of the rivets 56 are provided in spaced relationship around the sealing portion 44 to secure the upper and lower portions 52, 54 together, thereby holding the sealing member in the recess 48.

A seal engagement member in the form of a cylindrical tube 58 is mounted on a flange 60 of the fuel injector 26. The cylindrical tube 58 can be integral with the fuel injector 26, or it can be secured thereto by suitable securing means for example bolts 61A, extending through a flange 61B (shown in broken lines in FIG. 3) on the cylindrical tube 58.

The cylindrical member 58 has an outer surface 62 against which the sealing member 50 engages and seals to prevent leakage of air through the aperture 36. In view of the fact that the diameter of the tubular member 58 is much less than the diameter of the aperture 36, the level of sealing is considerably greater than with prior art sealing assemblies.

An annular securing flange 64 extends around the force absorbing portion 42 and defines a plurality of apertures 66 to receive bolts 68. The bolts are secured in threaded holes 70 in the outer casing 32.

The flexible force absorbing member 42 comprises a circular curved portion 72 of the seal carrier 40. The circular curved portion 72 is capable of resilient deformation during movement of the outer casing 32 relative to the inner casing 30. As a result, the forces created by the movement of the outer casing relative to the inner casing 30 are absorbed by the force absorbing portion 42, by virtue of its flexible nature and are not transmitted to the sealing portion 44. Thus, the sealing portion 44 is not distorted and remains in a generally circular configuration thereby maintaining appropriate sealing against the outer surface 62 of the tubular member 58.

As can be seen from FIG. 4 which shows a top plan view of the seal assembly 38, the seal carrier 40 is of a circular configuration, whereby the relatively flexible force absorbing portion 42 is also of a flexible configuration and extends around the sealing portion 44. As can be seen, the sealing portion 44 is also of a flexible configuration.

There is thus described a preferred embodiment of a combustor assembly 15 comprising a seal assembly 38, in which the seal carrier 40 has a sealing portion 44 which is held against a cylindrical tubular portion 58 by a flexible force absorbing portion 42. The force absorbing portion provides an advantage in the preferred embodiment in that it can absorb the distortion forces created by the movement of the outer casing 32 relative to the inner casing 30, thereby maintaining the seal against the tubular member 58.

Various modifications can be made without departing from the scope of the invention, for example, the tubular member 58 can be releasably mounted on the fuel injector 26. Also, the force absorbing portion could be of different configurations, for example as shown in FIGS. 5A and 5B. In FIG. 5A, the force absorbing portion 42 comprises three alternating circular curved portions 74, 76, 78. The three curved portions 74, 76, 78 alternate with each other, as shown, and comprise a first convex portion 74, being convex in a radially outward direction with respect to the combustor, a concave portion 76, being concave in a radially outward direction and a second convex portion 78, being also concave in a radially outward direction. The three curved portions 74, 76, 78 are annular and concentric with respect to one another.

In FIG. 5B, the force absorbing portion comprises an annular convex portion 80, having the convex region facing inwardly of the seal carrier 44, and annular concave portion 82, having the concave region facing inwardly of the seal carrier 44. The convex portion 80 and the concave portion 82 are annular and concentric with respect to each other.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A combustor assembly for a gas turbine engine, the combustor assembly comprising:
    a casing arrangement extending around a combustor, the casing arrangement defining an aperture; and
    a seal element mounted on the casing arrangement at said aperture through which a component of the combustor can extend, the component having a central axis,
    wherein the seal element includes a relatively flexible force absorbing portion and a relatively rigid sealing portion, the force absorbing portion being provided between the sealing portion and the casing arrangement, and the force absorbing portion being resiliently deformable in a direction perpendicular to the central axis to absorb forces during movement of the casing arrangement, whereby such resilient deformation restricts transmission of the forces to the sealing portion.

2. A combustor assembly according to claim 1 wherein the sealing portion includes a holder and a seal member, the seal member being held by the holder, and
    the sealing portion is configured to allow axial movement between the casing arrangement and the combustor.

3. A combustor assembly according to claim 1 wherein the seal element and the force absorbing portion are annular in configuration.

4. A combustor assembly according to claim 1 wherein the sealing portion is annular in configuration, and the force absorbing portion and the sealing portion are concentric with respect to one another, such that the force absorbing portion extends around the sealing portion.

5. A combustor assembly according to claim 1 wherein the force absorbing portion comprises a curved portion.

6. A combustor assembly according to claim 5 wherein the curved portion is generally semi-circular.

7. A combustor assembly according to claim 5 wherein the curved portion is of a varying radius.

8. A combustor assembly according to claim 2 wherein the holder defines an inwardly facing recess, such that the seal member extends inwardly from the holder.

9. A combustor assembly according to claim 8 wherein the combustor assembly further includes a seal engagement member against which the seal member can seal, whereby the aforesaid component of the combustor can be mounted on the seal engagement member.

10. A combustor assembly according to claim 9 wherein the seal engagement member defines a tubular portion through which the component can extend.

11. A combustor assembly according to claim 9 wherein the seal engagement member comprises a securing means to secure the aforesaid component to the engagement member.

12. A combustor assembly according to claim 11 wherein the securing means comprises a flange, which is cooperable with fastening means to fasten the seal engagement member to the component.

13. A combustor assembly according to claim 12 wherein the fastening means comprise bolts.

14. A combustor assembly according to claim 9 wherein the seal engagement member is integrally mounted on the aforesaid component of the combustor.

15. A combustor assembly according to claim 9 wherein the casing arrangement comprises an outer casing and an inner casing, and the seal engagement member is secured directly or indirectly to the inner casing.

16. A combustor assembly according to claim 15 wherein the seal engagement member is secured to the inner casing via the securing means.

17. A combustor assembly according to claim 1, wherein the combustor is of an annular configuration, and a plurality of the aforesaid components are spaced from each other around the combustor.

18. A combustor assembly according to claim 17 wherein the casing arrangement defines a plurality of the apertures spaced from one another, each aperture being configured to receive a respective one of the aforesaid components.

19. A combustor assembly according to claim 1 wherein the seal element is generally circular in configuration, and the force absorbing portion comprises a diaphragm.

20. A combustor assembly according to claim 19 wherein the force absorbing portion comprises a curved region to provide at least some of the flexibility.

21. A combustor assembly according to claim 1 wherein the seal element comprises a mounting portion extending from the force absorbing portion to secure the seal element to the casing arrangement.

22. A combustor assembly according to claim 21 wherein the mounting portion comprises a flange extending around the seal element.

23. A combustor assembly according to claim 11 wherein the seal engagement member is substantially cylindrical in configuration and at least part of the aforesaid component of the combustor extends generally along the main axis of the cylinder.

24. A combustor assembly according to claim 23 wherein the seal member is generally circular in configuration, and has an inwardly facing sealing surface, to seal against an outwardly facing sealing surface of the seal engagement member.

25. A gas turbine engine incorporating a combustor assembly according to claim 1.

* * * * *